United States Patent
Deng et al.

(10) Patent No.: US 11,007,961 B2
(45) Date of Patent: May 18, 2021

(54) DEPLOYABLE VEHICLE ASSEMBLY

(71) Applicant: Ford Global Technologies, LLC, Dearborn, MI (US)

(72) Inventors: Zhibing Deng, Northville, MI (US); Joseph Edward Abramczyk, Farmington Hills, MI (US); Deepak Patel, Canton, MI (US); Yun Cai, Canton, MI (US); Zhaorong Li, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 183 days.

(21) Appl. No.: 16/036,341

(22) Filed: Jul. 16, 2018

(65) Prior Publication Data
US 2020/0017052 A1    Jan. 16, 2020

(51) Int. Cl.
| | | |
|---|---|---|
| *B60R 21/215* | (2011.01) | |
| *B60R 21/04* | (2006.01) | |
| *B60R 21/207* | (2006.01) | |
| *B60R 21/231* | (2011.01) | |
| *B60R 7/04* | (2006.01) | |
| *B60R 21/02* | (2006.01) | |
| *B60R 21/00* | (2006.01) | |

(52) U.S. Cl.
CPC .......... *B60R 21/04* (2013.01); *B60R 21/207* (2013.01); *B60R 21/23138* (2013.01); *B60R 7/04* (2013.01); *B60R 2021/0006* (2013.01); *B60R 2021/0273* (2013.01); *B60R 2021/23146* (2013.01)

(58) Field of Classification Search
CPC ..... B60R 7/04; B60R 21/23138; B60R 21/02; B60R 21/20; B60R 21/08; B60R 2021/23161; B60R 2021/0213; B60R 2021/0273; B60N 2/753; B60N 2/793; B60N 2/4235
USPC .............................................. 280/730.2, 751
See application file for complete search history.

(56) References Cited

U.S. PATENT DOCUMENTS

| | | | | |
|---|---|---|---|---|
| 5,172,790 | A * | 12/1992 | Ishikawa | B60R 21/20 180/268 |
| 5,222,761 | A * | 6/1993 | Kaji | B60R 21/017 280/730.2 |
| 7,594,675 | B2 | 9/2009 | Bostrom et al. | |
| 7,806,457 | B2 * | 10/2010 | Bankert | B60J 7/1621 296/100.05 |
| 9,428,136 | B2 * | 8/2016 | Ishida | B60R 21/207 |
| 9,434,340 | B2 * | 9/2016 | Egusa | B60R 7/04 |
| 9,637,078 | B2 * | 5/2017 | Bull | B60N 3/108 |
| 2008/0129020 | A1 * | 6/2008 | Bostrom | B60R 21/207 280/728.2 |

(Continued)

FOREIGN PATENT DOCUMENTS

| | | |
|---|---|---|
| JP | 2009166774 A | 7/2009 |
| JP | 2010120411 A | 6/2010 |

(Continued)

*Primary Examiner* — Toan C To
(74) *Attorney, Agent, or Firm* — Frank A. MacKenzie; Bejin Bieneman PLC (57) ABSTRACT

An assembly includes a seat. The assembly includes a bin adjacent the seat and defining a chamber having an open top. The assembly includes an uninflatable member having a front and a rear and above the open top, the uninflatable member movable to an elevated position with the front and the rear spaced from the bin.

19 Claims, 11 Drawing Sheets

(56) References Cited

U.S. PATENT DOCUMENTS

| | | | | |
|---|---|---|---|---|
| 2008/0129024 A1* | 6/2008 | Suzuki | ............ | B60R 21/23138 |
| | | | | 280/734 |
| 2013/0057011 A1* | 3/2013 | Yamagishi | ................ | B60R 7/04 |
| | | | | 296/24.34 |
| 2017/0057416 A1* | 3/2017 | Yang | ........................ | B60R 7/04 |

FOREIGN PATENT DOCUMENTS

| | | | |
|---|---|---|---|
| JP | 2010234886 | A | 10/2010 |
| JP | 2014184855 | A | 10/2014 |
| JP | 5870889 | B2 | 3/2016 |

\* cited by examiner

DEPLOYABLE VEHICLE ASSEMBLY

BACKGROUND

A vehicle may include a deployable assembly that is deployable during a vehicle impact to control kinematics of occupants inside the vehicle during the impact. A computer may command an actuator to move the deployable assembly to a deployed position in response to detecting a vehicle impact.

DETAILED DESCRIPTION

An assembly includes a seat. The assembly includes a bin adjacent the seat and defining a chamber having an open top. The assembly includes an uninflatable member having a front and a rear and above the open top, the uninflatable member movable to an elevated position with the front and the rear spaced from the bin.

The assembly may include a processor and a memory storing instructions executable by the processor to move the uninflatable member to the elevated position in response to detecting a vehicle impact.

The memory may store instructions executable by the processor to actuate an airbag after moving the uninflatable member to the elevated position.

The assembly may include a lid covering the open top and pivotally supported by the bin, the uninflatable member above and supported by the lid.

The assembly may include an actuator between the lid and the uninflatable member and configured to move the uninflatable member to the elevated position.

The assembly may include a covering extending over the uninflatable member and the lid, the covering including a tear seam extending about an entire perimeter of the uninflatable member.

The assembly may include a plurality of tabs extending from the uninflatable member to the lid.

The assembly may include a support member slidably supported by the lid and pivotally fixed to the uninflatable member.

The assembly may include a second support member closer to the front of the uninflatable member than the support member.

The uninflatable member may include a base supported by the bin and a lid covering the open top and pivotally supported by the base.

The assembly may include a covering extending over the base and the bin, the covering including a tear seam extending about an entire perimeter of the base.

The base may define a passage that provides access to the bin.

An assembly includes a seat. The assembly includes a bin adjacent the seat and defining a chamber having an open top. The assembly includes a lid pivotally supported by the bin and pivotable relative to the bin to an open position. The assembly includes a processor and a memory storing instructions executable by the processor to pivot the lid to the open position in response to detecting a vehicle impact.

The assembly may include a latch movable to an open state permitting the lid to pivot to the open position, and an actuator configured to move the latch to the open state and the lid to the open position.

The assembly may include a cable connecting the actuator to the latch.

The cable may be under the bin.

The assembly may include an actuator moveable to an extended position, and a wedge moveable by the actuator and operatively engaging the lid to the open position when the actuator is in the extended position.

The lid may include a rear edge and the wedge may operatively engage the rear edge.

The wedge may define a V-shape.

The memory may store instructions executable by the processor to actuate an airbag after moving the lid to the open position.

With reference to the Figures, wherein like numerals indicate like parts throughout the several views, a deployable assembly 20, 120, 220 to control lateral movement of an occupant of a vehicle 22 includes a seat 24 and a bin 26 adjacent the seat 24 and defining a chamber 28 having an open top 30. In some example embodiments, shown in FIGS. 1-9, the deployable assembly 20, 120 includes an uninflatable member 32, 132 having a front 34, 84 and a rear 36, 86. The uninflatable member 32, 132 is above the open top 30 and movable to an elevated position with the front 34, 84 and the rear 36, 86 spaced from the bin 26. As another example, in the embodiment shown in FIG. 10-13, the deployable assembly 220 includes a lid 38 pivotally supported by the bin 26 and movable relative to the bin 26 to an open position. The deployable assembly 20, 120, 220 includes a computer 40 having a processor and a memory storing instructions executable by the processor to pivot the lid 38 to the open position or the uninflatable member 32, 132 to the elevated position in response to detecting a vehicle impact. Moving the lid 38 to the open position or the uninflatable member 32, 132 to the elevated position may aid in controlling kinematics of an occupant of the vehicle 22, e.g., during a vehicle impact. For example, the lid 38 in the open position or the uninflatable member 32, 132 in the elevated position may block lateral movement of the occupant, provide a reaction surface to an airbag 106, etc.

Figure 1:
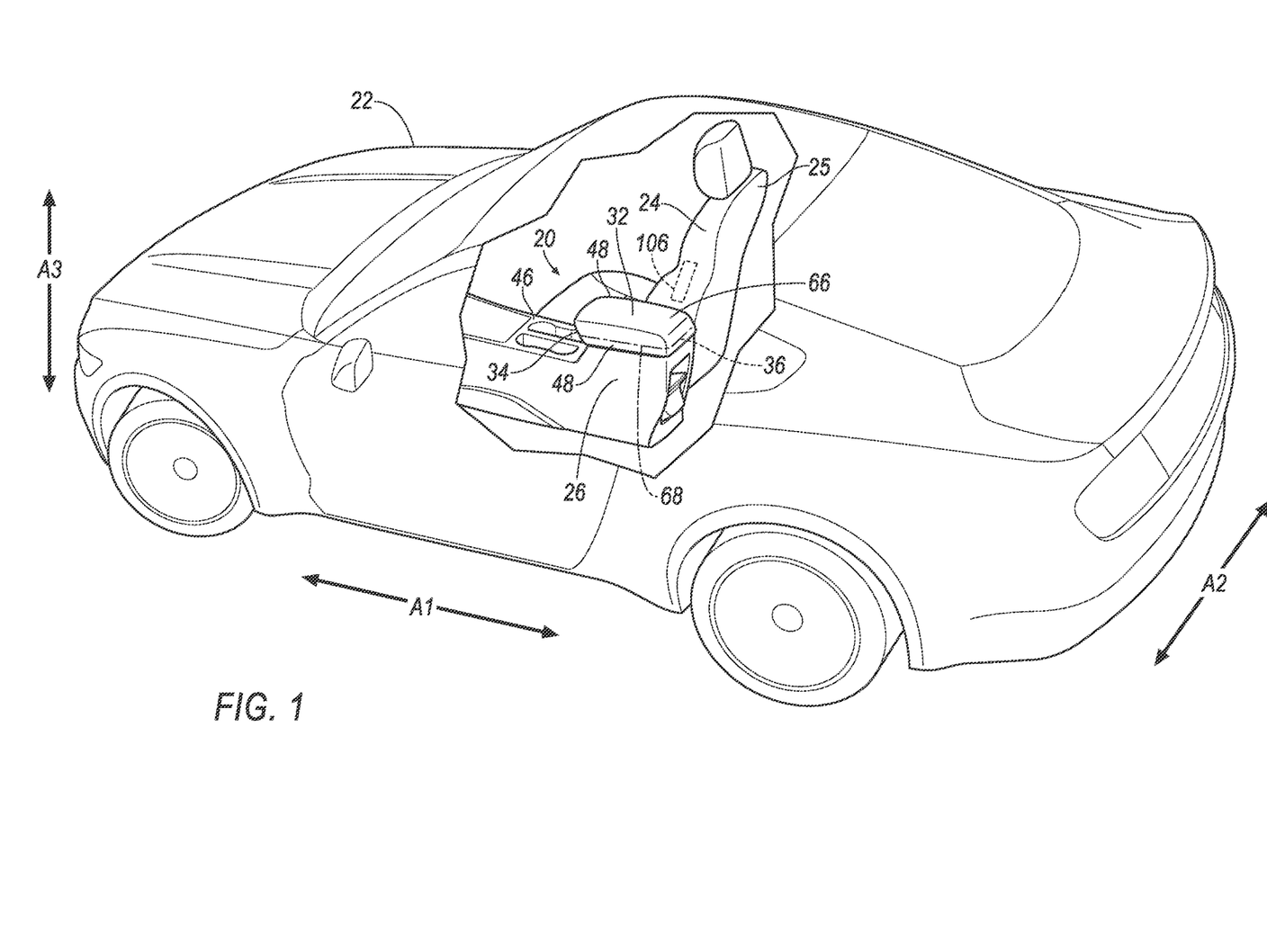
FIG. 1 is a perspective view of a vehicle having a deployable assembly in a lowered position.

The vehicle 22 may be any passenger or commercial automobile such as a car, a truck, a sport utility vehicle, a crossover vehicle, a van, a minivan, a taxi, a bus, etc. The vehicle 22 may define a vehicle-longitudinal axis A1, e.g., extending between a front and rear of the vehicle 22. The vehicle 22 may define a cross-vehicle axis A2, e.g., extending between a right side and a left side of the vehicle 22. The vehicle 22 may define a vehicle-vertical axis A3, e.g., extending between a top and a bottom of the vehicle 22. The front, rear, top, bottom, right side, and left side may be relative to an orientation of the occupant of the vehicle 22. The front, rear, top, bottom, right side, and left side may be relative to an orientation of controls for operating the vehicle 22, e.g., a steering wheel, an instrument panel of the vehicle 22, etc. The front, rear, top, bottom, right side, and left side may be relative a driving direction of the vehicle 22 when wheels of the vehicle 22 are all parallel with each other, etc.

The vehicle 22 may include one or more seats 24. The seat 24 shown is a bucket seat, alternatively the seat 24 may be a bench seat or another type of seat. The seat 24 may include a seatback 25, a seat bottom (not numbered), and a head restraint (not numbered). The head restraint may be supported by the seatback 25 and may be stationary or movable relative to the seatback 25. The seatback 25 may be supported by the seat bottom and may be stationary or movable relative to the seat bottom.

The seat 24 may include a frame and a covering supported on the frame. The frame may include tubes, beams, etc. The frame may be formed of any suitable plastic material, e.g., carbon fiber reinforced plastic (CFRP), glass fiber-reinforced semi-finished thermoplastic composite (organosheet), etc. As another example, some or all components of the frame may be formed of a suitable metal, e.g., steel, aluminum, etc. The covering may include upholstery and padding. The upholstery may be formed of cloth, leather, faux leather, or any other suitable material. The padding may be foam or any other suitable material.

The bin 26 provides storage, e.g., to hold personal items of the occupant such as money, a cellphone, etc. The bin 26 defines the chamber 28, e.g., between a bottom 42 and sidewalls 44 extending upwardly from the bottom 42. The bin 26 has the open top 30. The open top 30 may be between the sidewalls 44 and opposite the bottom 42. The occupant may add or remove items to or from the chamber 28 via the open top 30.

The bin 26 is adjacent one or more of the seat 24. For example, the bin 26 may be in a center console 46 of the vehicle 22 between the seats 24. As another example, the bin 26 may be supported by the seat 24, e.g., fixed to the frame of the seat 24. The bin 26 may be plastic or any other suitable material.

With reference to the embodiments show in FIGS. 1-9, the uninflatable member 32, 132 has the front 34 and the rear 36. The front 34 and rear 36 may be relative to one of the seats 24, e.g., an orientation of the occupant seated in such seat 24, the front 34 may be farther from the seatback 25 of such seat 24 than the rear 36, etc. The front 34 and rear 36 may be relative to the vehicle 22, e.g., to the vehicle-longitudinal axis A1, the front and the rear of the vehicle 22, etc. The uninflatable member 32, 132 may include a pair of opposing sides 48 extending between the front 34 and the rear 36. The uninflatable member 32, 132 is above the open top 30. The uninflatable member 32, 132 may be supported by the bin 26, the center console 46, or any suitable structure.

The uninflatable member 32, 132 is movable from a lowered position, shown in FIGS. 1, 2, 4, 6, and 8, to the elevated position, shown in FIGS. 3, 5, 7, and 9. The front 34 and the rear 36 of the uninflatable member 32, 132 in the elevated position is spaced from the bin 26. In other words, the front 34 and the rear 36 of the uninflatable member 32, 132 are farther from the bin 26 in the elevated position than in the lowered position. For example, the front 34 and the rear 36 of the bin 26 may be higher relative the vehicle-vertical axis A3, in the elevated position than in the lowered position.

With reference to the embodiment shown in FIGS. 1-5, the deployable assembly 20 may include a lid 50. The lid 50 covers the open top 30. The lid 50 may be pivotally supported by the bin 26, e.g., with a hinge, etc. The lid 50 may pivot between a closed position and an open position. The lid 50 in the closed position may extend across the open top 30 and restrict access to the chamber 28 of the bin 26. The lid 50 in the open position may be spaced from the open top 30 and permit access to the chamber 28.

The uninflatable member 32 may be above the lid 50. In other words, the lid 50 may be between the uninflatable member 32 and the bin 26. The uninflatable member 32 may be supported by the lid 50. For example, the uninflatable member 32 in the lowered position may about the lid 50. As another example, the inflatable member may include a plurality of tabs 52 extending from the uninflatable member 32 to the lid 50. The tabs 52 may be received in holes 54 or other structures of the lid 50. Similarly, the lid 50 may include a plurality of tabs extending from the lid 50 to the uninflatable member 32 (not shown). The tabs 52 limit movement of the uninflatable member 32 relative to the lid 50, e.g., along the vehicle-longitudinal A1 and cross-vehicle axis A2.

The deployable assembly 20 may include one or more support members 56, shown in FIGS. 2-5. The support members 56 connect the uninflatable member 32 to the lid 50. Each support member 56 may be slidably supported by the lid 50, e.g., each support member 56 may slide relative to the lid 50 from a first position, shown in FIGS. 2 and 4, to a second position, shown in FIGS. 3 and 5, and vise-versa. The support members 56 may pivot relative to the lid 50. For example, each support member 56 may be connected to the lid 50 with a connecting rod 58 that slides along one or more tracks 60 of the lid 50. The support members 56 may each be pivotally fixed to the uninflatable member 32, e.g., with a hinge or any other suitable structure. One of the support members 56 may be closer to the front 34 of the uninflatable member 32 than another of the support members 56. In other words, the support members 56 may be spaced from each other along the vehicle-longitudinal axis A1. For example, the connecting rod 58 may have cross-vehicle portions pivotally supporting the support members 56. The cross-vehicle portions may be spaced from each other along the vehicle-longitudinal axis A1 and connected to each other with longitudinal portions of the connecting rod 58.

Movement of the support members 56 from the first position to the second position may move the uninflatable member 32 from the lowered position to the elevated position. For example, as the support members 56 and the connecting rod 58 slide along the tracks 60 from the first position to the second position, normal forces generated between a reaction surface 62 of the lid 50 and the support members 56 may case the support members 56 to pivot, e.g., about the connecting rod 58, and urge the uninflatable member 32 from the lowered position away from the lid 50 to the elevated position.

Figure 4:
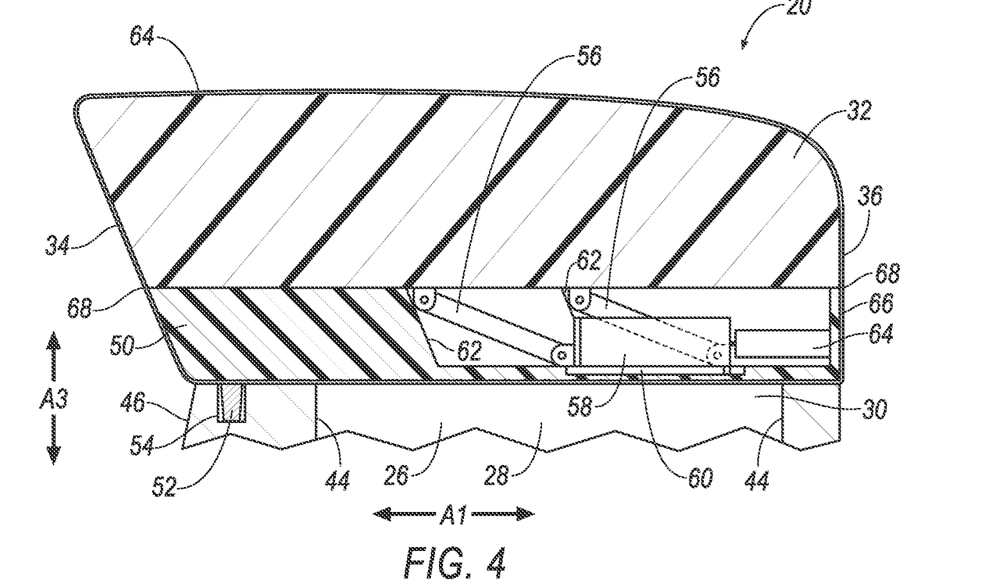
FIG. 4 is a side cross-section view of the deployable assembly in the lowered position.
Figure 5:
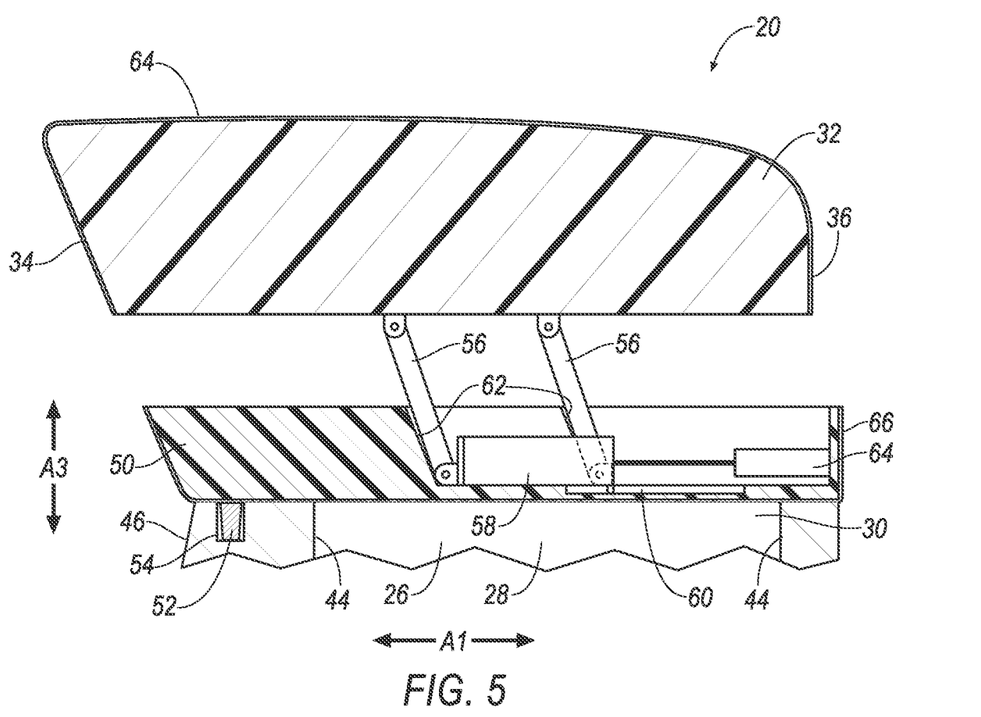
FIG. 5 is a side cross-section view of the deployable assembly in the elevated position.

The deployable assembly 20 may include an actuator 64. The actuator 64 may be configured to move the uninflatable member 32 to the elevated position, e.g., in response to an instruction from the computer 40. The actuator 64 may be a pyrotechnic-type actuator, or any other suitable type of actuator 64. For example, the actuator 64 may include a piston and a cylinder. Pyrotechnic material may be in the cylinder adjacent the piston. Actuation of the pyrotechnic material, e.g., in response to an instruction from the computer 40, may generate gas and urge the piston within the cylinder to move the actuator 64 from a retracted position to an extended position. The actuator 64 is longer in the extended position than in the retracted position. The actuator 64 may be between the lid 50 and the uninflatable member 32. The actuator 64 may move from the retracted position to the extended position along the vehicle-longitudinal axis A1. One end of the actuator 64 may be connected to one or more support members 56, e.g., the connecting rod 58 may connect the actuator 64 to the support members 56. An opposite end of the actuator 64 may be connected the lid 50, e.g., via a fastener, etc. Movement of the actuator 64 from the retracted position to the extended position may move the support members 56 from the first positions to the second positions.

Figure 2:
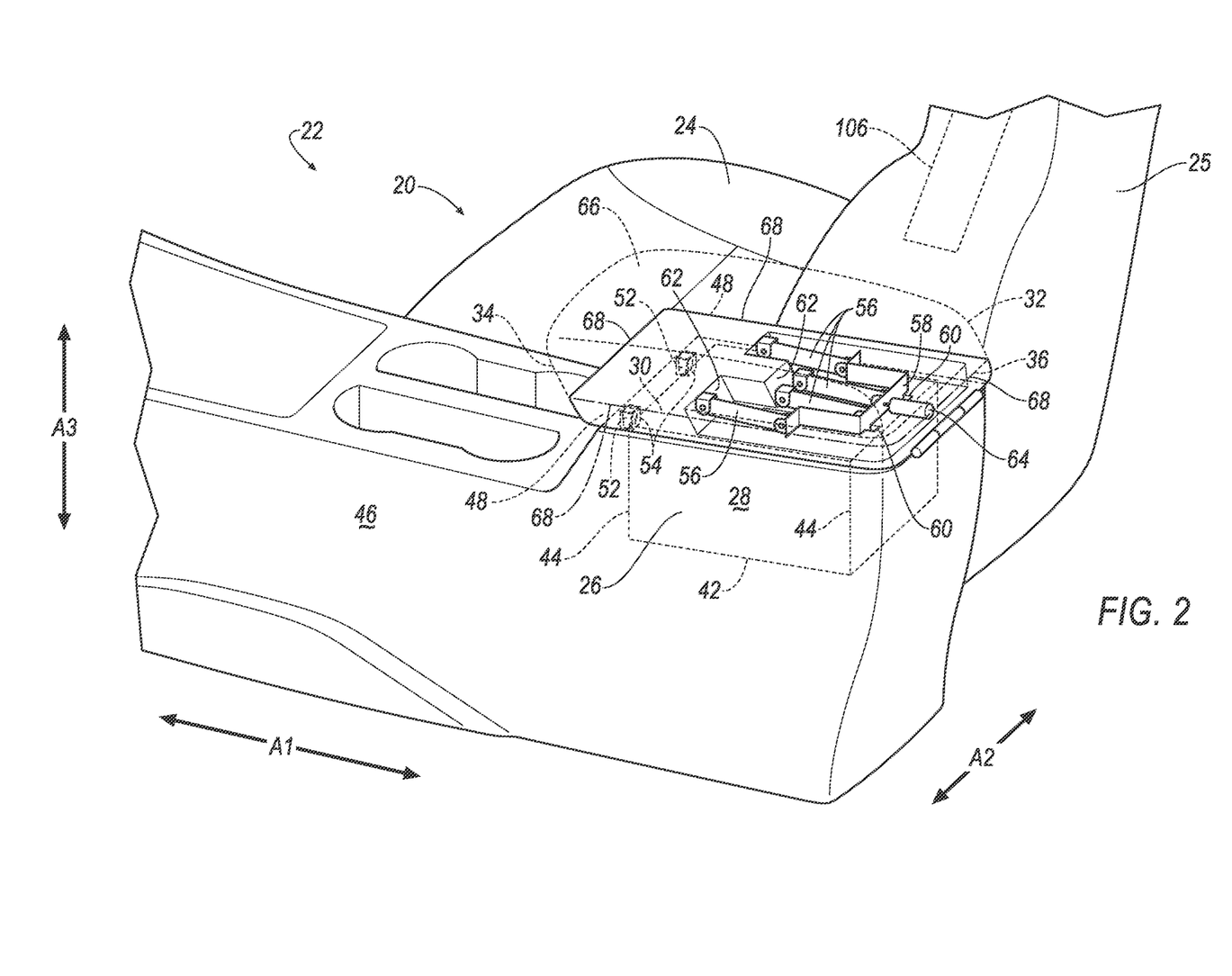
FIG. 2 is a perspective view of the deployable assembly in the lowered position.
Figure 3:
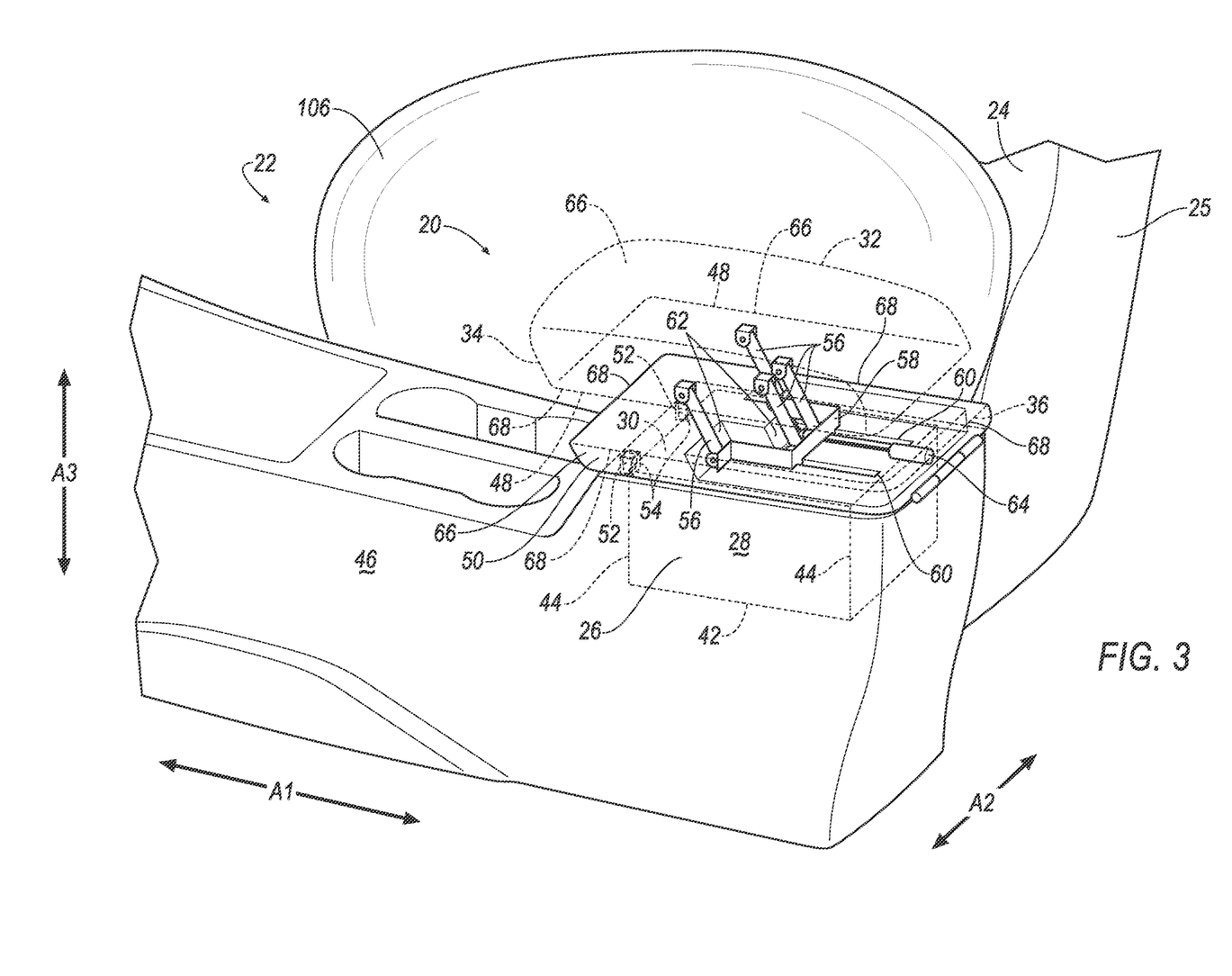
FIG. 3 is a perspective view of the deployable assembly in an elevated position.

The deployable assembly 20 may include a covering 66. The covering 66 may extend over the uninflatable member 32 and the lid 50. The covering 66 may be fabric, leather, or any suitable material. The provides a class-A surfaces to the lid 50 and the uninflatable member 32, i.e., surfaces specifically manufactured to have a high-quality, finished aesthetic appearance free of blemishes, etc. The covering 66 may include a tear seam 68. The tear seam 68 is designed to rupture upon moving the uninflatable member 32 to the extended position. The tear seam 68 may be weaker than a portion of the covering 66 adjacent the tear seam 68, e.g., the tear seam 68 may be thinner, a weaker material, etc. The tear seam 68 may connect panels of the covering 66, e.g., with breakaway stitches. The tear seam 68 may extend about an entire perimeter of the uninflatable member 32. In other words, the tear seam 68 may define a closed loop extending along the front 34, the rear 36, and the opposing sides 48 of the uninflatable member 32, e.g., along the vehicle-longitudinal axis A1 and the cross-vehicle axis A2. Moving the uninflatable member 32 to the extended position may rupture the covering 66 into a first portion and a second portion that are completely spaced from each other, i.e., into two distinct and unconnected sections.

With reference to the embodiment shown in FIGS. 6-9, the uninflatable member 132 may include a base 70. The base 70 may be supported by the bin 26. For example, the base 70 may abut the bin 26 when the uninflatable member 132 in the lowered position. As another example, the base 70 may include a plurality of tabs 72 extending from the base 70 to the bin 26. The tabs 72 may be received in holes 74 or other structures of the bin 26. Similarly, the bin 26 may include a plurality of tabs extending from the bin 26 to the base 70 (not shown). The tabs 72 limit movement of the base 70 relative to the bin 26, e.g., along the vehicle-longitudinal axis A1 and the cross-vehicle axis A2. The base 70 may define a passage 76. For example, the base 70 may be rectangular, and the passage 76 may extend through a center of such rectangle. The passage 76 provides access to the bin 26. For example, the passage 76 may align with the open top 30 of the bin 26 such that the occupant may add or remove items from the chamber 28 of the bin 26 via the passage 76.

The uninflatable member 132 may include a lid 78. The lid 78 may be pivotally supported by the base 70, e.g., with a hinge. The lid 78 may cover the open top 30. The lid 78 may cover the passage 76 of the base 70. The lid 78 may pivot between a closed position and an open position. The lid 78 in the closed position may extend across the open top 30 and the passage 76 and restrict access to the chamber 28 of the bin 26. The lid 78 in the open position may be spaced from the open top 30 and the passage 76 and permit access to the chamber 28.

Figure 6:
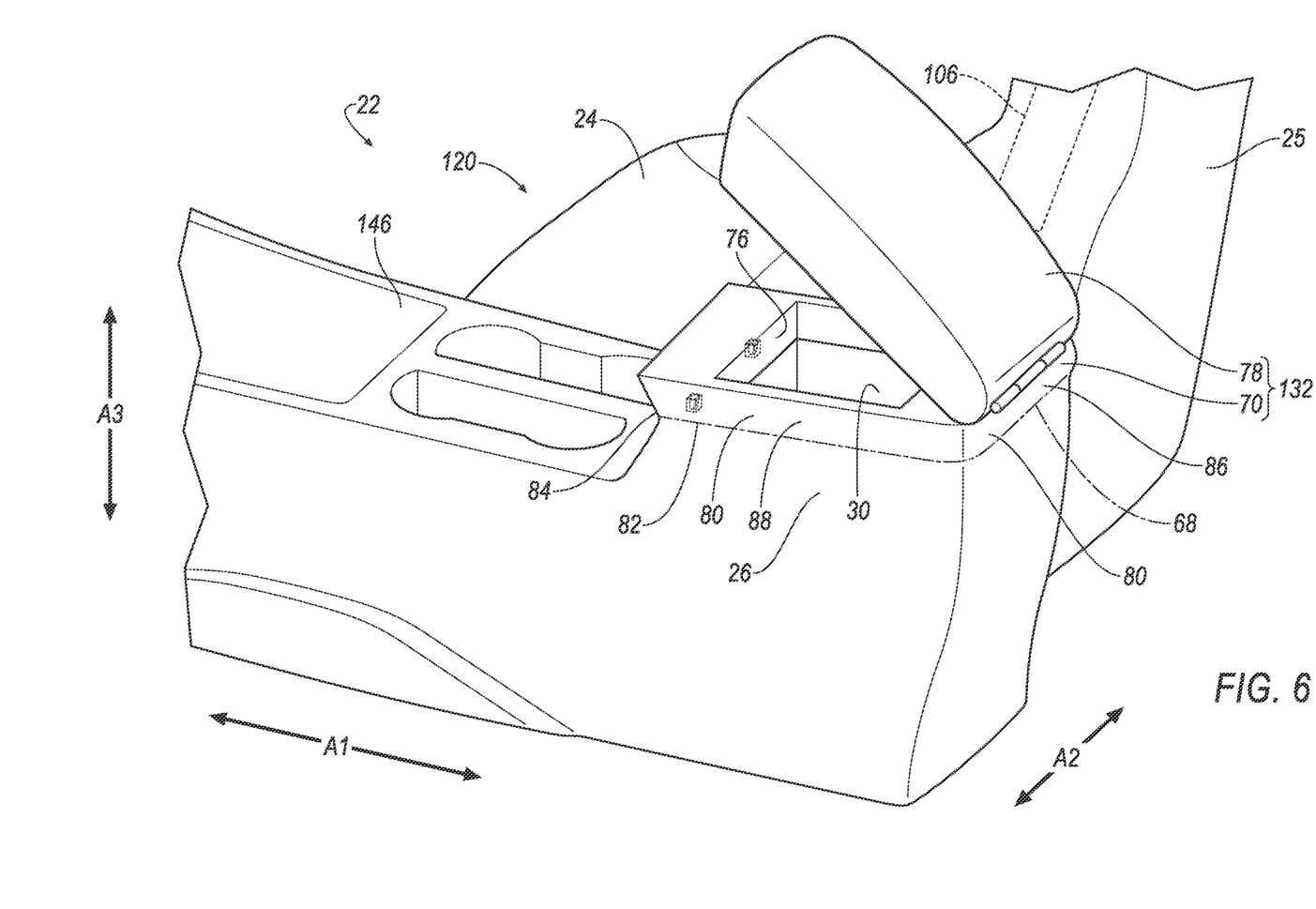
FIG. 6 is a perspective view of another embodiment of a deployable assembly in a lowered position and having a lid in an open position.
Figure 7:
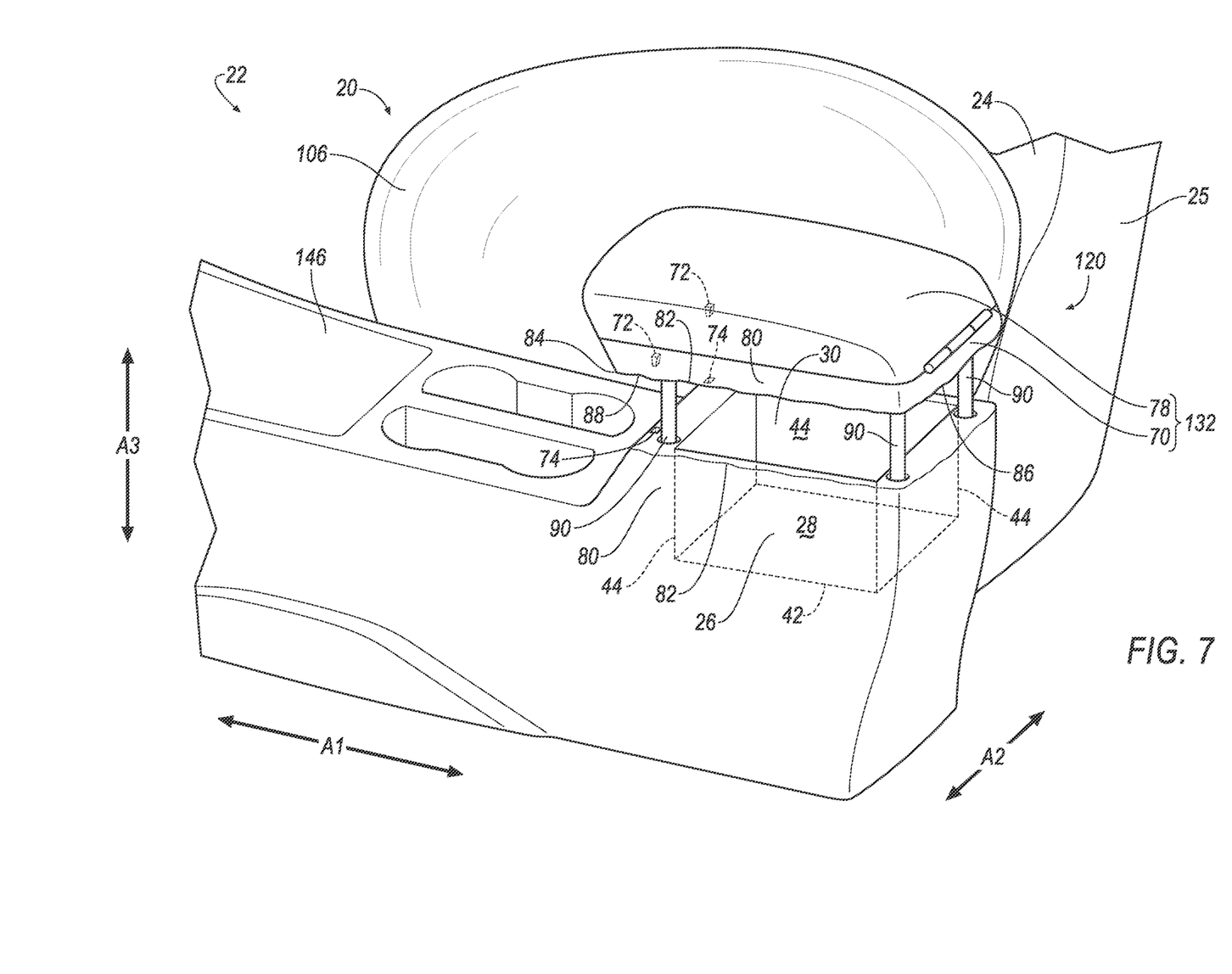
FIG. 7 is a perspective view of the deployable assembly of FIG. 6 in an elevated position and having the lid in a closed position.

The deployable assembly 120 may include a covering 80. The covering 80 may extend over the base 70 and the bin 26. The covering 80 may be fabric, leather, or any suitable material. The provides a class-A surfaces to the lid 78 and the uninflatable member 132, i.e., s surface specifically manufactured to have a high-quality, finished aesthetic appearance free of blemishes, etc. The covering 80 may include a tear seam 82. The tear seam 82 is designed to rupture upon moving the uninflatable member 132 to the extended position. The tear seam 82 may be weaker than a portion of the covering 80 adjacent the tear seam 82, e.g., the tear seam 82 may be thinner, a weaker material, etc. The tear seam 82 may connect panels of the covering 80, e.g., with breakaway stitches. The tear seam 82 may extend about an entire perimeter of the base 70. In other words, the tear seam 82 may define a closed loop extending along the front 84, the rear 86, and opposing sides 88 of the base 70, e.g., along the vehicle-longitudinal axis A1 and the cross-vehicle axis A2. Moving the uninflatable member 132 to the extended position may rupture the covering 80 into first and second portions that are completely spaced from each other.

Figure 8:
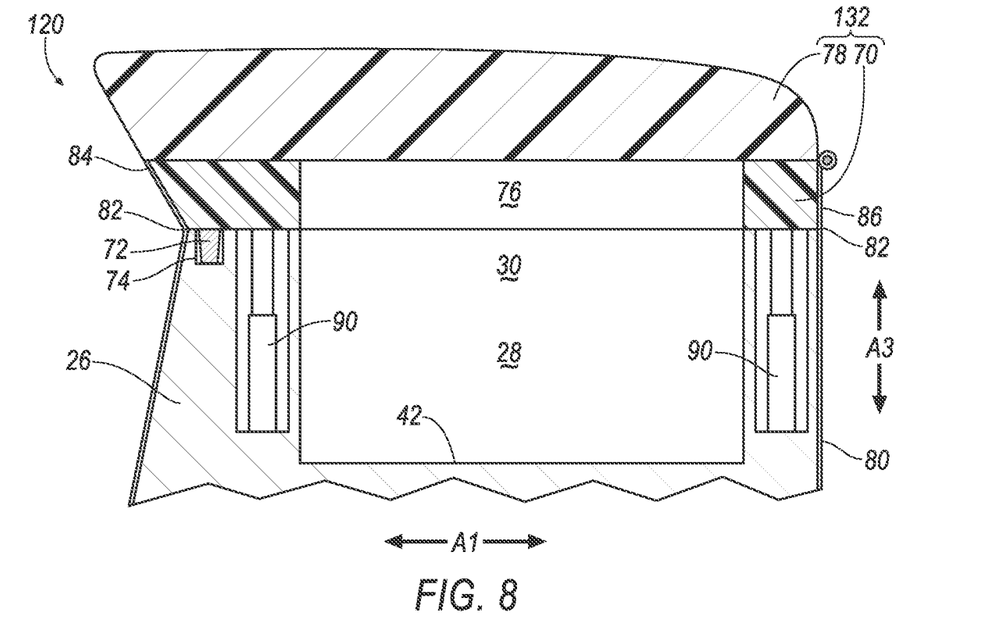
FIG. 8 is a side cross-section view of the deployable assembly of FIG. 6 in the lowered position.
Figure 9:
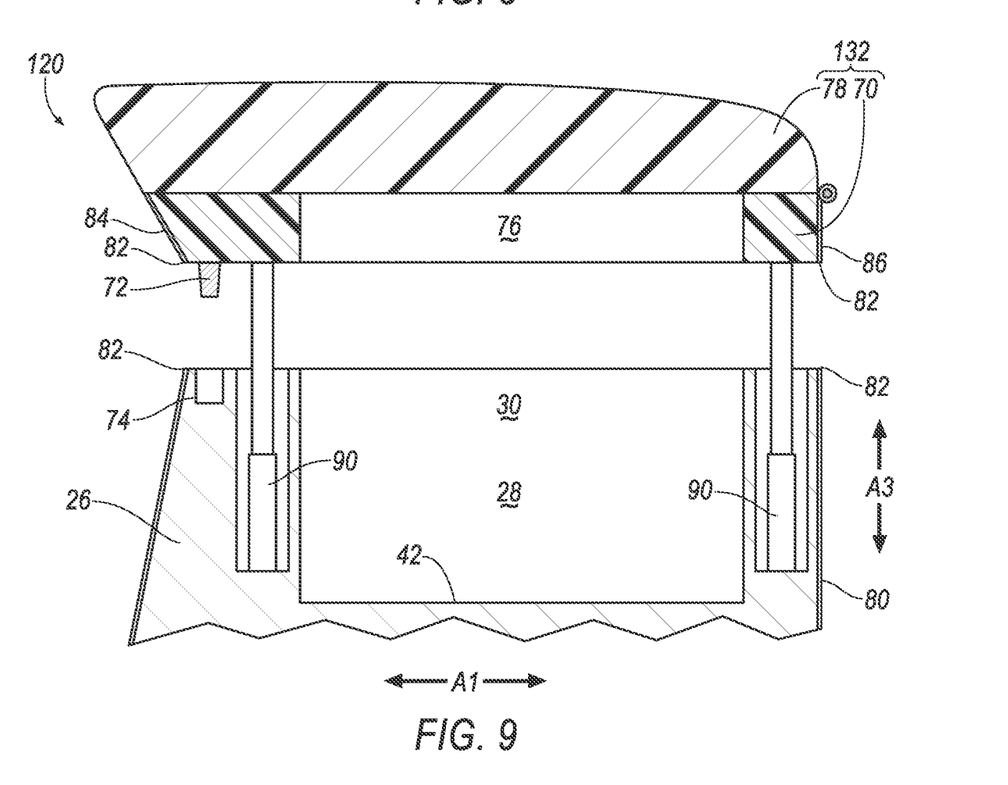
FIG. 9 is a side cross-section view of the deployable assembly of FIG. 6 in the elevated position.
Figure 10:
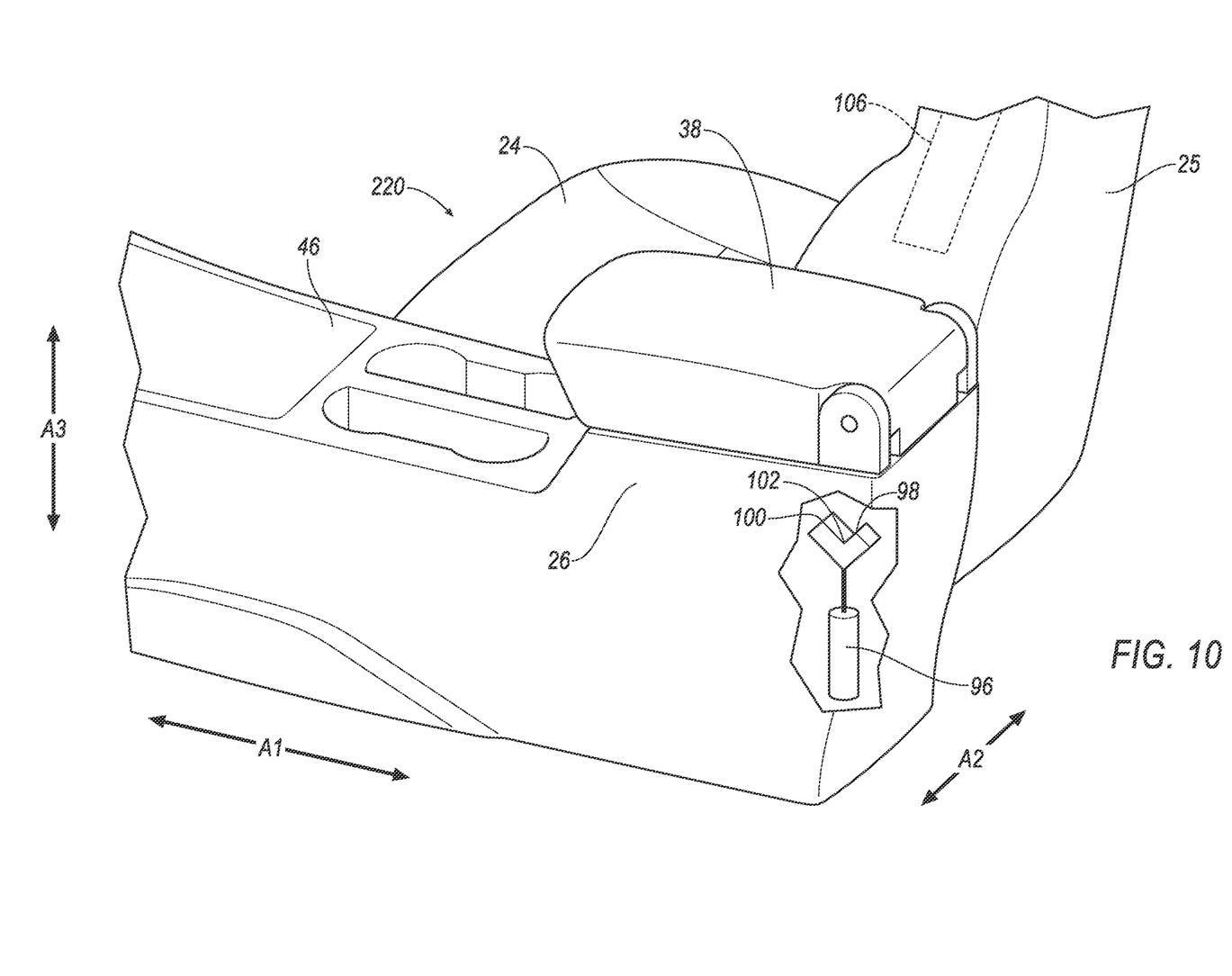
FIG. 10 is a perspective view of another embodiment of a deployable assembly in a lowered position.
Figure 11:
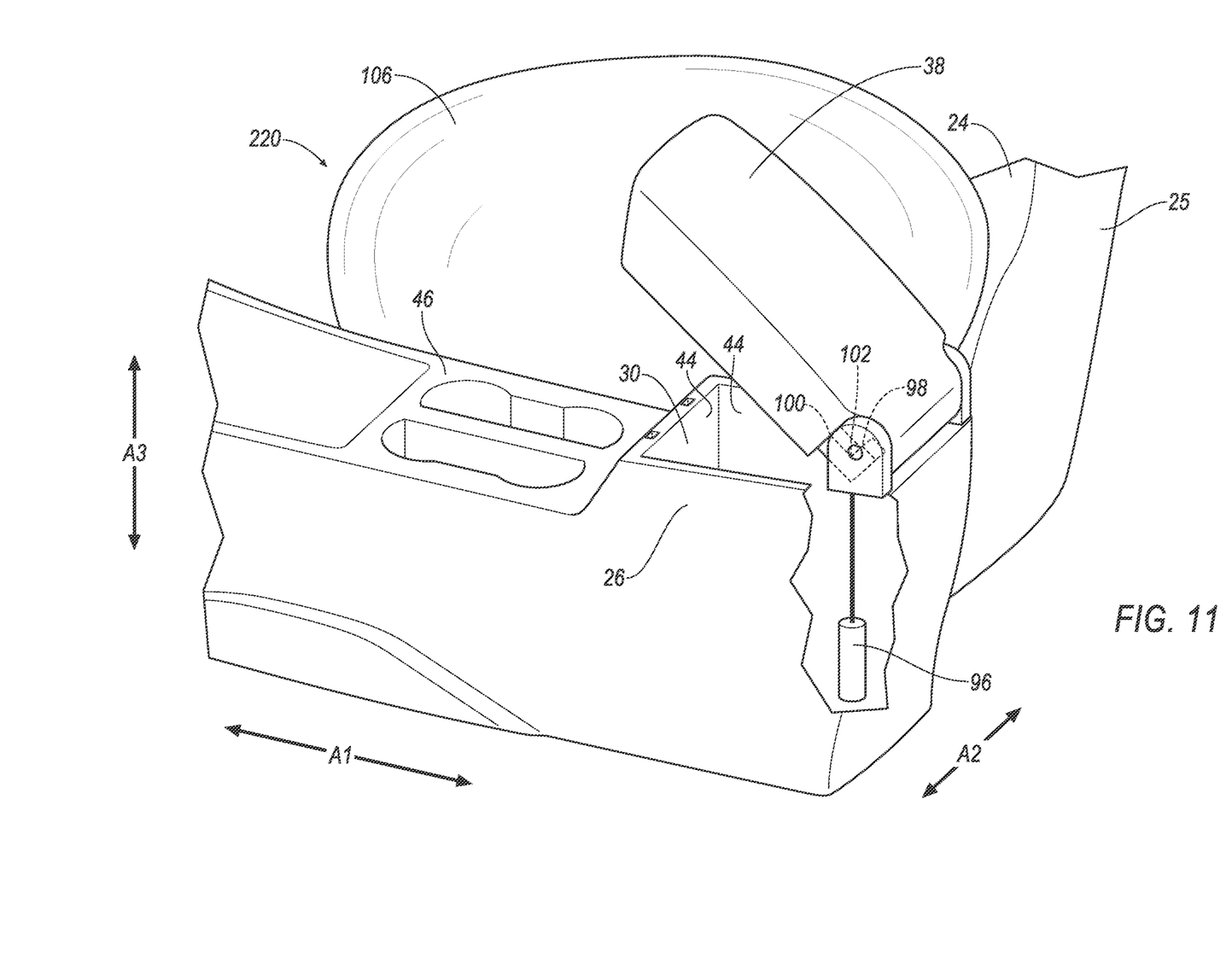
FIG. 11 is a perspective view of the deployable assembly of FIG. 10 in an elevated position.

The deployable assembly 120 may include an actuator 90. The actuator 90 may actuate to an extended position e.g., as described for the actuator 64. The actuator 90 may be configured to move the uninflatable member 132 to the elevated position, e.g., in response to an instruction from the computer 40. The one end of the actuator 90 may be connected to the base 70. An opposite end of the actuator 90 may be connected to the bin 26, the center console 46, etc. Movement of the actuator 90 from a retracted position to the extended position may urge the base 70 and the lid 78 away from the bin 26.

With reference to the embodiment shown in FIGS. 10-13, the deployable assembly 20 may include a lid 38. The lid 38 may be pivotally supported by the bin 26, e.g., with a hinge or the like. The lid 38 may be pivotable relative to the bin 26 from a closed position to an open position. The lid 38 in the closed position restricts access to the chamber 28 of the bin 26. The lid 38 in the open position permits access to the chamber 28 of the bin 26. The lid 38 may include a rear edge 92. The rear edge 92 may be elongated along the cross-vehicle axis A2.

Figure 12:
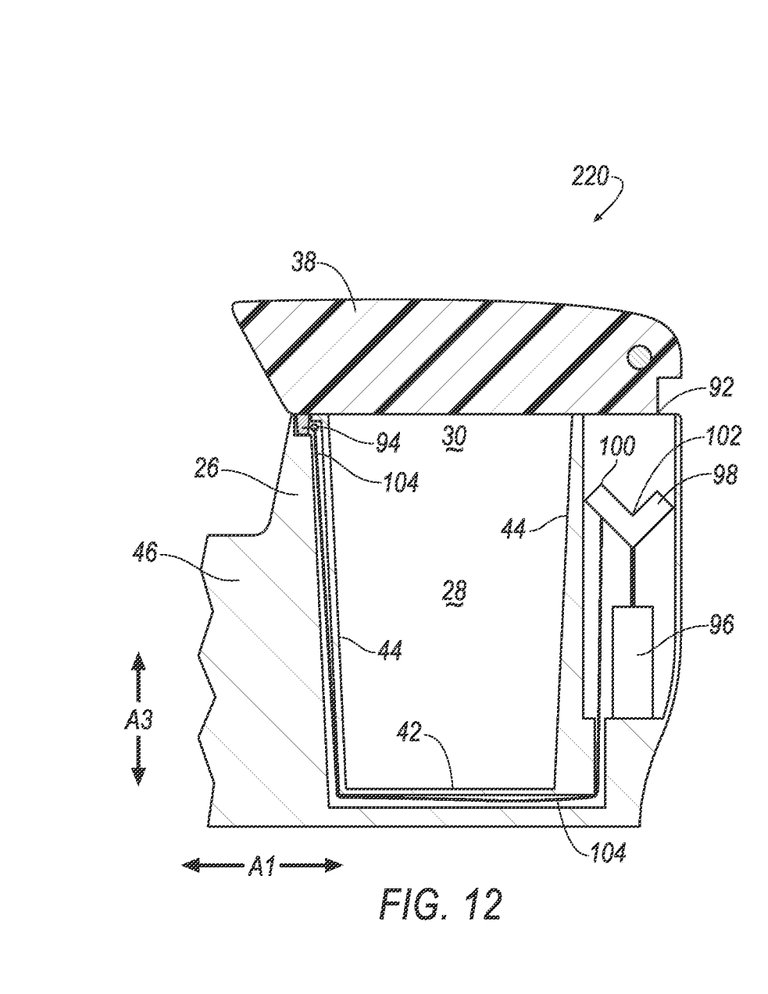
FIG. 12 is a side cross-section view of the deployable assembly of FIG. 10 in the lowered position.
Figure 13:
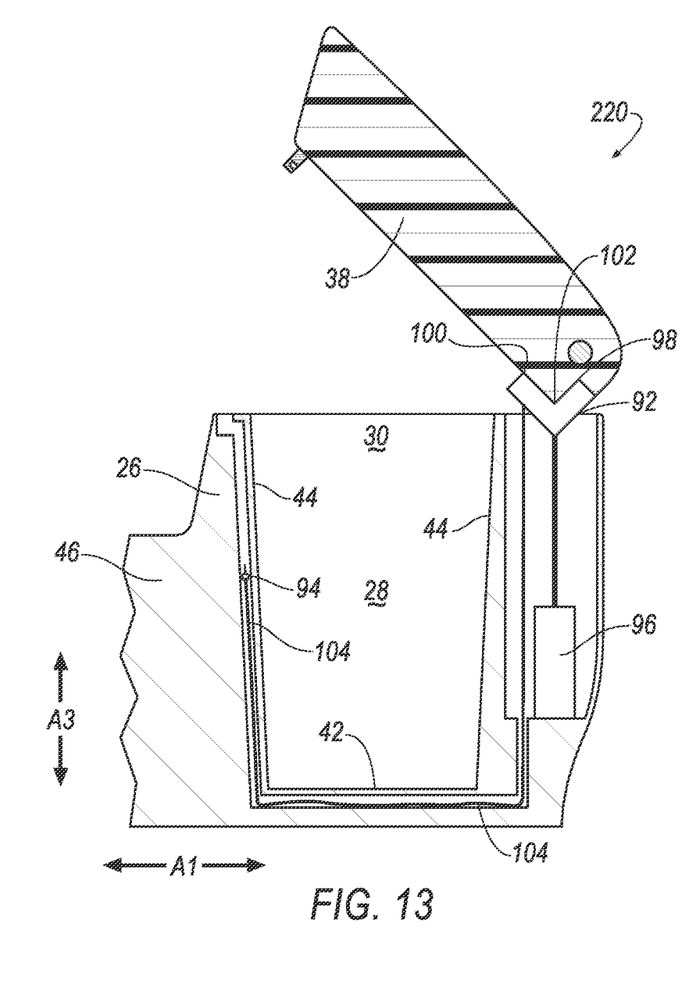
FIG. 13 is a side cross-section view of the deployable assembly of FIG. 10 in the elevated position.

The deployable assembly 220 may include a latch 94. The latch 94 may be supported by the bin 26. The latch 94 may be movable from a closed state to an open state. The latch 94 in the closed state may inhibit the lid 38 from moving from the closed position to the open position. For example, in the closed state the latch 94 may operatively engage the lid 38 to prevent movement of the lid 38 relative to the bin 26. The latch 94 in the open state permits the lid 38 to pivot from the closed position to the open position. For example, the latch 94 in the closed state may not engage the lid 38.

The deployable assembly 220 may include an actuator 96. The actuator 96 may actuate from a retraced position to an extended position, e.g., as described for the actuator 64. The actuator 96 may be supported by the bin 26. The actuator 96 may be elongated along the vehicle-vertical axis A3. The actuator 96 may be under the rear edge 92 of the lid 38.

The actuator 96 may be configured to pivot the lid 38 to the open position e.g., in response to an instruction from the computer 40. For example, the deployable assembly 20 may include a wedge 98. The wedge 98 may be elongated along the cross-vehicle axis A2. The wedge 98 may define a V-shape, e.g., in cross section along the vehicle-longitudinal axis A1. The V-shape may include a top front edge 100 and a valley 102. The wedge 98 may be moveable by the actuator 96, e.g., along the vehicle-vertical axis A3. For example, the wedge 98 may be fixed to an end of the actuator 96 and move with the actuator 96 from the retraced position to the extended position. The wedge 98 may operatively engage the lid 38 to the open position when the actuator 96 is in the extended position. For example, the wedge 98 may move upwardly as the actuator 96 moves to the extended position. The top front edge 100 may abut the lid 38 in front of the rear edge 92 and urge to lid 38 to the open position. The wedge 98 may operatively engage the rear edge 92 of the lid 38 when the actuator 96 is in the extended position. For example, the rear edge 92 may be received in valley 102 of the wedge 98.

The actuator 96 may be configured to pivot the latch 94 to the open state, e.g., when the actuator 96 moves from the retracted position to the extended position. For example, a cable 104 may connect the actuator 96 to the latch 94. The cable 104 may be under the bin 26. For example, the cable 104 may be connected to the end of the actuator 96 having the wedge 98 and extend under the chamber 28 of the bin 26 to the latch 94. Actuation of the actuator 96 from the retracted position to the extended position may generate tension in the cable 104. The tension in the cable 104 may be transferred to the latch 94 and urge the latch 94 from the closed state to the open state.

Returning to the embodiments shown in FIGS. 1-13, the vehicle 22 may include one or more airbags 106. The airbags 106 may be inflatable from uninflated positions, shown in FIGS. 1, 2, 6, and 10, to inflated positions, shown in FIGS. 3, 7, and 11. The airbags 106 may be supported by the seats 24, e.g., at a side of the seatback 25 adjacent the center console 46, at a side of the seat bottom (not shown), etc. The airbag 106 may be supported by the center console 46 adjacent one of the seats 24 (not shown), or at any other suitable location. The airbag 106 may be formed of a woven polymer or any other material. As one example, the airbag 106 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The uninflatable member 32, 132 in the elevated position, or the lid 38 in the open position, provides a reaction surface for the airbag 106 in the inflated position. It other words, the uninflatable member 32, 132 in the elevated position, or the lid 38 in the open position, may provide additional rigidity to the airbag 106 in the inflated position to control kinematics of an occupant during a vehicle impact, e.g., a side impact. For example, the uninflatable member 32, 132 in the elevated position, or the lid 38 in the open position, may support the airbag 106 in the inflated position relative to the cross-vehicle axis A2.

Figure 14:
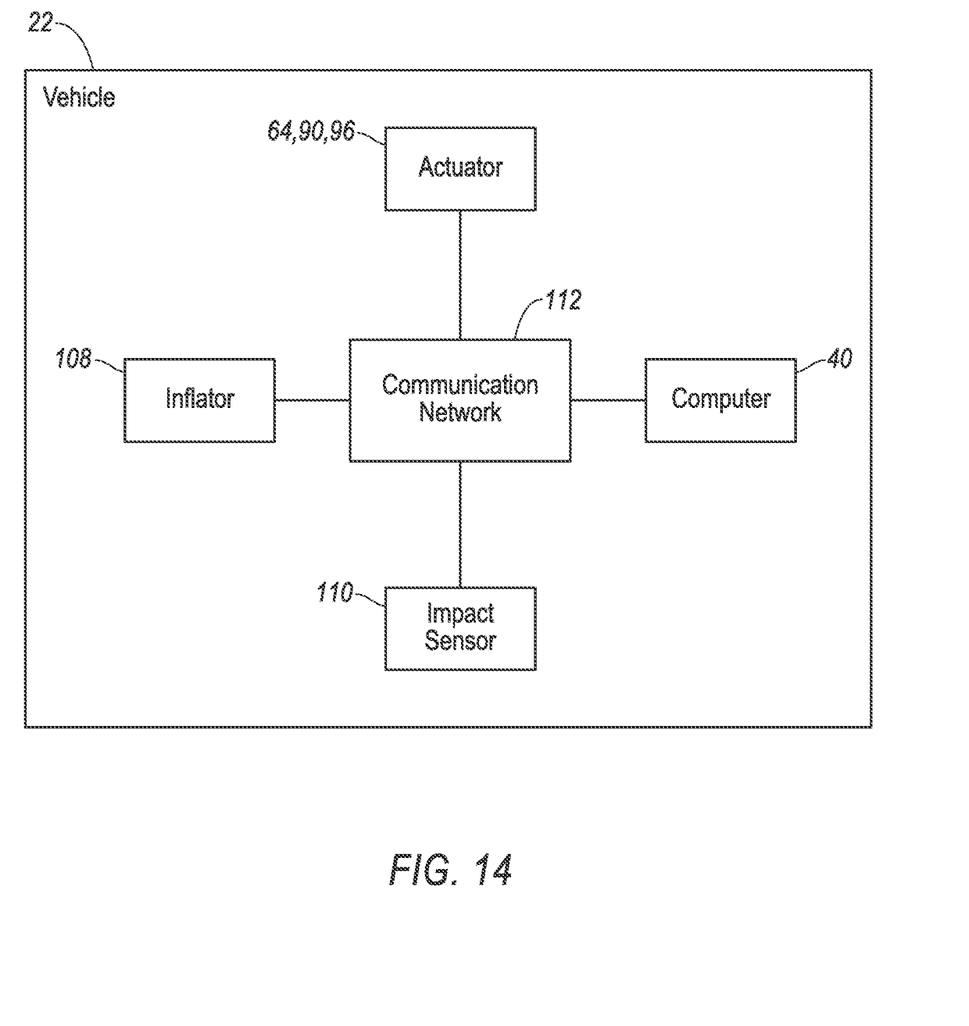
FIG. 14 is a block diagram of components of the vehicle.

An inflator 108, shown in FIG. 14, may be connected to one or more of the airbags 106. Upon receiving a signal from, e.g., the computer 40, the inflator 108 may inflate the airbag 106 with an inflatable medium, such as a gas. The inflator 108 may be, for example, a pyrotechnic inflator that uses a chemical reaction to drive inflation medium to the airbag 106. The inflator 108 may be of any suitable type, for example, a cold-gas inflator.

The vehicle 22 may include an impact sensor 110, shown in FIG. 14. The impact sensor 110 is programmed to detect an impact to the vehicle 22. The impact sensor 110 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 110 may be located at numerous points in or on the vehicle 22.

The vehicle 22 may include a communication network 112, shown in FIG. 14. The communication network 112 includes hardware, such as a communication bus, for facilitating communication among vehicle components. The communication network 112 may facilitate wired or wireless communication among the components, e.g., the inflator 108, the actuator 64, 90, 96, the impact sensor 110, the computer 40, etc., in accordance with a number of communication protocols such as controller area network (CAN), Ethernet, WiFi, Local Interconnect Network (LIN), and/or other wired or wireless mechanisms.

The computer 40 may be a microprocessor-based controller implemented via circuits, chips, or other electronic components. For example, the computer 40 may include a processor, a memory, etc. The memory of the computer 40 may include memory for storing instructions executable by the processor as well as for electronically storing data and/or databases.

The computer 40 may be programmed to detect a vehicle impact. For example, the computer 40 may detect a vehicle impact based on information received from the impact sensor 110 via the communication network 112.

The computer 40 may be programmed to move the uninflatable member 32, 132 to the elevated position. For example, the computer 40 may transmit a command to the actuator 64, 90 via the communication network 112 instructing actuation to the extended position. The computer 40 may move the uninflatable member 32, 132 to the elevated position in response to detecting a vehicle impact.

The computer 40 may be programmed to pivot the lid 38 to the open position. For example, the computer 40 may transmit a command to the actuator 96 via the communication network 112 instructing actuation to the extended position. The computer 40 may pivot the lid 38 to the open position in response to detecting a vehicle impact.

The computer 40 may be programmed to actuate the airbag 106. For example, the computer 40 may transmit a command to the inflator 108 via the communication network 112 instructing actuation to generate inflation gas. The computer 40 may actuate the airbag 106 after moving the uninflatable member 32, 132 to the elevated position. The computer 40 may actuate the airbag 106 after moving the lid 38 to the open position. For example, the computer 40 may wait a predetermined amount of time, e.g., 100 milliseconds, between actuating the actuator 64, 90. 94 and the inflator 108.

In the event of an impact, the impact sensor 110 may detect the impact and transmit a signal through the communication network 112 to the computer 40. The computer 40 may transmit a signal through the communications network to the actuator 64, 90, 96 instructing actuation to the extended position. Next, computer 40 may wait the predetermined amount of time and then transmit a signal through the communication network 112 to the inflator 108 instructing actuation to discharge and inflate the airbag 106.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
   a seat;
   a bin adjacent the seat and defining a chamber having an open top;
   an uninflatable member having a front and a rear and above the open top, the uninflatable member movable to an elevated position with the front and the rear spaced from the bin;
   a processor; and
   a memory storing instructions executable by the processor to move the uninflatable member to the elevated position in response to detecting a vehicle impact.

2. The assembly of claim 1, wherein the memory stores instructions executable by the processor to actuate an airbag after moving the uninflatable member to the elevated position.

3. The assembly of claim 1, further comprising a lid covering the open top and pivotally supported by the bin, the uninflatable member above and supported by the lid.

4. The assembly of claim 3, further comprising an actuator between the lid and the uninflatable member and configured to move the uninflatable member to the elevated position.

5. The assembly of claim 3, further comprising a covering extending over the uninflatable member and the lid, the covering including a tear seam extending about an entire perimeter of the uninflatable member.

6. The assembly of claim 3, further comprising a plurality of tabs extending from the uninflatable member to the lid.

7. The assembly of claim 3, further comprising a support member slidably supported by the lid and pivotally fixed to the uninflatable member.

8. The assembly of claim 7, further comprising a second support member closer to the front of the uninflatable member than the support member.

9. The assembly of claim 1, wherein the uninflatable member includes a base supported by the bin and a lid covering the open top and pivotally supported by the base.

10. The assembly of claim 9, further comprising a covering extending over the base and the bin, the covering including a tear seam extending about an entire perimeter of the base.

11. The assembly of claim 9, wherein the base defines a passage that provides access to the bin.

12. An assembly comprising:
    a seat;
    a bin adjacent the seat and defining a chamber having an open top;
    a lid pivotally supported by the bin and pivotable relative to the bin to an open position;
    a processor; and
    a memory storing instructions executable by the processor to pivot the lid to the open position in response to detecting a vehicle impact.

13. The assembly of claim 12, further comprising a latch movable to an open state permitting the lid to pivot to the open position, and an actuator configured to move the latch to the open state and the lid to the open position.

14. The assembly of claim 13, further comprising a cable connecting the actuator to the latch.

15. The assembly of claim 14, wherein the cable is under the bin.

16. The assembly of claim 12, further comprising an actuator moveable to an extended position, and a wedge moveable by the actuator and operatively engaging the lid to the open position when the actuator is in the extended position.

17. The assembly of claim 16, wherein the lid includes a rear edge and the wedge operatively engages the rear edge.

18. The assembly of claim 16, wherein the wedge defines a V-shape.

19. The assembly of claim 12, wherein the memory stores instructions executable by the processor to actuate an airbag after moving the lid to the open position.

* * * * *